(12) United States Patent
Chhabra et al.

(10) Patent No.: US 9,204,375 B2
(45) Date of Patent: Dec. 1, 2015

(54) DETERMINING PARAMETERS OF AN ACCESS POINT

(71) Applicant: Apple Inc., Cupertino, CA (US)

(72) Inventors: Kapil Chhabra, Milpitas, CA (US); Artiom Shamis, Los Gatos, CA (US); Veerendra M. Boodannavar, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 117 days.

(21) Appl. No.: 13/773,256

(22) Filed: Feb. 21, 2013

(65) Prior Publication Data

US 2014/0233406 A1 Aug. 21, 2014

(51) Int. Cl.
*H04W 48/16* (2009.01)
*H04W 48/14* (2009.01)
*H04W 84/12* (2009.01)
*H04W 48/20* (2009.01)

(52) U.S. Cl.
CPC .............. *H04W 48/16* (2013.01); *H04W 48/14* (2013.01); *H04W 84/12* (2013.01)

(58) Field of Classification Search
CPC .................................................... H04W 48/16
See application file for complete search history.

(56) References Cited

U.S. PATENT DOCUMENTS

| | | | | |
|---|---|---|---|---|
| 8,131,291 | B2* | 3/2012 | Jeong et al. | 455/434 |
| 8,155,643 | B2* | 4/2012 | Jung | 455/432.1 |
| 8,971,807 | B2* | 3/2015 | Hillyard | 455/41.2 |
| 2006/0045018 | A1* | 3/2006 | Masri | 370/241 |
| 2006/0111103 | A1* | 5/2006 | Jeong et al. | 455/434 |
| 2006/0187873 | A1* | 8/2006 | Friday et al. | 370/328 |
| 2008/0151796 | A1* | 6/2008 | Jokela | 370/310 |
| 2010/0322198 | A1* | 12/2010 | Friday et al. | 370/332 |
| 2011/0038357 | A1* | 2/2011 | Gong | 370/338 |

(Continued)

FOREIGN PATENT DOCUMENTS

| | | |
|---|---|---|
| WO | 2012041401 A1 | 4/2012 |
| WO | 2012159071 A1 | 11/2012 |

OTHER PUBLICATIONS

Emmelmann, Marc "Optimised Network Selection; 11-11-1015-01-00ai—optimised-networks-selection", IEEE Draft, IEEE-SA Mentor, Piscataway, NJ, USA, vol. 802.11ai, No. 1, Jul. 21, 2011, pp. 1-12, XP017674023.

(Continued)

*Primary Examiner* — John Pezzlo
*Assistant Examiner* — William Johnson
(74) *Attorney, Agent, or Firm* — Park, Vaughan, Fleming & Dowler LLP; A. Richard Park

(57) ABSTRACT

A method and system are described for determining parameters of an access point (AP). In the described embodiments, during a first time period, a portable electronic device (PED) scans for APs on a wireless local area network (WLAN) channel. Then, when an AP is detected on the WLAN channel, the PED determines if the AP includes a general advertisement service (GAS) protocol to make available information related to services provided by the AP. If the AP includes the GAS protocol, then the PED transmits a GAS request frame to the AP. If a response to the GAS request frame is not received from the AP within the first time period, then the PED extends the dwell time to wait for the response for a second time period, wherein a duration of the second time period is determined based on a total allowable time to scan for APs.

20 Claims, 5 Drawing Sheets

(56) References Cited

U.S. PATENT DOCUMENTS

| | | | |
|---|---|---|---|
| 2011/0164525 A1* | 7/2011 | Denteneer | 370/252 |
| 2012/0201143 A1* | 8/2012 | Schmidt et al. | 370/241 |
| 2012/0300746 A1* | 11/2012 | Ibrahim et al. | 370/331 |
| 2012/0300759 A1* | 11/2012 | Patanapongpibul et al. | 370/338 |
| 2013/0107703 A1* | 5/2013 | Cherian et al. | 370/230 |
| 2013/0176897 A1* | 7/2013 | Wang et al. | 370/254 |
| 2013/0215757 A1* | 8/2013 | Vandwalle et al. | 370/241 |
| 2013/0230035 A1* | 9/2013 | Grandhi et al. | 370/338 |
| 2013/0294354 A1* | 11/2013 | Zhang et al. | 370/329 |
| 2014/0003355 A1* | 1/2014 | Iyer et al. | 370/329 |
| 2014/0016569 A1* | 1/2014 | Chen et al. | 370/329 |
| 2015/0156710 A1* | 6/2015 | Montemurro et al. | 370/329 |

OTHER PUBLICATIONS

Wi-Fi Alliance: Wi-Fi Certified Passpoint, retrieved from Internet Oct. 19, 2012.

Certified Wireless Network Professional: Hotspot 2.0 and the Next Generation Hotspot, retrieved from Internet Oct. 19, 2012.

IEEE Standard for Information Technology: Amendment 9: Interworking with External Networks, IEEE Feb. 15, 2011.

\* cited by examiner

DETERMINING PARAMETERS OF AN ACCESS POINT

BACKGROUND

1. Field

The described embodiments relate to methods for communicating with an access point. More specifically, the described embodiments relate to determining information related to services provided by access points.

2. Related Art

Portable electronic devices, such as smartphones, typically can send and receive data using a cellular data connection and a wireless local area network (WLAN) connection, which often uses IEEE 802.11 technology (e.g., a WiFi network). Users may have a limit to the amount of data that can be sent and received using the cellular data connection (e.g., monthly) without incurring additional expense; therefore, users may desire to connect to a WLAN when it can be done efficiently and cost effectively.

Using protocols such as those in the IEEE 802.11u amendment, a portable electronic device may be able to determine which wireless carrier and/or organization memberships or authorizations are required for the portable electronic device to be able to connect to an access point such as a hotspot. However, when a user enters an area that has a number of access points available on potentially numerous different channels, information may have to be gathered from each of these access points in order to help the user make an informed decision about which access points are the most desirable to join.

BRIEF DESCRIPTION OF THE FIGURES

In the figures, like reference numerals refer to the same figure elements.

DETAILED DESCRIPTION

Figure 1:
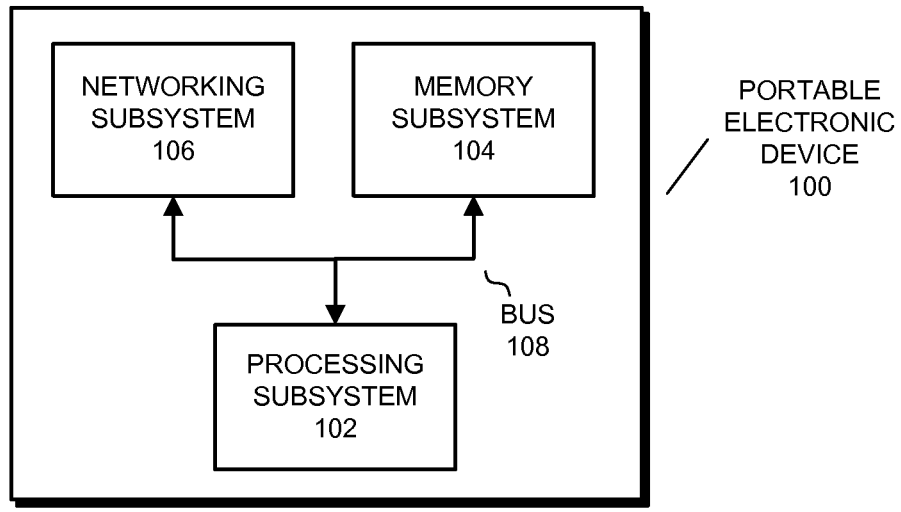
FIG. 1 presents a block diagram illustrating a portable electronic device in accordance with described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a portable electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to one or more application-specific integrated circuit (ASIC) chips, field-programmable gate arrays (FPGAs), other programmable-logic devices, dedicated logic devices, and microcontrollers. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When a device (e.g., a portable electronic device) with computing capabilities reads and executes the code and/or data stored on the computer-readable storage medium, the device performs the methods and processes embodied as data structures and code and stored within the computer-readable storage medium. For example, in some embodiments, a processing subsystem can read the code and/or data from a memory subsystem that comprises a computer-readable storage medium and can execute code and/or use the data to perform the methods and processes.

In the following description, we refer to "some embodiments." Note that "some embodiments" may describe a subset of all of the possible embodiments, but does not always specify the same subset of embodiments.

Overview

Described embodiments perform operations for determining parameters of an access point (e.g., a hotspot). In described embodiments, a portable electronic device searches for wireless local area networks (WLANs) and queries access points for information related to the services they provide. A portable electronic device can be or include, but is not limited to, a smartphone, a tablet computer, a laptop computer, a netbook, or any portable device that includes a network subsystem that can search for WLANs and query access points for information related to the services they provide.

When a user carrying a portable electronic device, such as a smartphone, wishes to connect to a WLAN (e.g., a WiFi network), the user may activate the portable electronic device so that it begins searching for WLANs. The portable electronic device begins scanning to discover available WLANs (e.g., sending probe request frames). The portable electronic device will remain on each channel scanning for WLANs for a predetermined dwell time (e.g., 40 ms), before changing to the next channel. WLANs respond to the portable electronic device (e.g., in a probe response frame) with information, including the service set identification (SSID) of the WLAN, and if the WLAN is an access point that implements 802.11u technology, supports the generic advertisement service (GAS) protocol and therefore can respond to GAS queries. After the dwell time for a channel has elapsed, the portable electronic device switches to the next channel and again scans for WLANs. After all channels have been scanned, the portable electronic device may display information associated with each WLAN detected (e.g., SSID) to the user. The portable electronic device may then return to each channel that included an access point implementing a protocol that allows it to communicate information related to the services provided, such as those access points that can respond to GAS queries. The portable electronic device then queries the access point for the information, for example, by sending out GAS queries to each of these access points.

If the access point is capable of responding to GAS queries, then the portable electronic device may include a request for one or more available types of information; see the IEEE standard 802.11u amendment (available as on the date of the filing of this document at http://standards.ieee.org/get-ieee802/download/802.11u-2011.pdf), which is hereby incorporated by reference. The portable electronic device may send GAS queries for information including, but not limited to, access network query protocol (ANQP) elements such as network access identifier (NAI), organization identifier, (OI), IP address availability information, available bandwidth, public land mobile network (PLMN) (including the mobile country code (MCC) and mobile network code (MNC)), and any other information. As the responses to the GAS queries are received by the mobile device, it may update the list of available WLANs displayed to the user, for example, by adding or removing WLANs based on the received information.

For example, a portable electronic device may send GAS queries to access points to determine information, including the MCC and MNC of each access point. The portable electronic device may then list only those access points that have an MCC and MNC that are compatible with one or more of the services subscribed to by the user (e.g., as determined by the portable electronic device through a query of a subscriber identity module (SIM) card). The portable electronic device may then remove from the list of available WLANs access points that do not have MCCs and MNCs compatible with the services the user subscribes to.

During operation of described embodiments, when the portable electronic device first scans a channel for WLANs, if the portable electronic device receives a probe response frame from a WLAN indicating that it includes a mechanism that allows it to make available information related to the services it provides (e.g., the access point can respond to GAS queries), then the portable electronic device implements the mechanism (e.g., send the GAS query) to the access point without first scanning other WLAN channels (e.g., while still scanning the channel the access point was identified on). The portable electronic device will then wait on the channel for the dwell time to receive the response from the access point, and any other access points that have been queried. However, if an access point does not respond within the dwell time, the portable electronic device may extend the dwell time on a channel to wait for the response. The portable electronic device may determine if the dwell time should be extended, and by how much, based on information, including how long the scan has already taken, experimental or other statistical information related to how long such responses usually take, and information related to user experience based on total wait time. In some embodiments, the portable electronic device may extend the dwell time for an additional 40 ms on a channel until the total scan time for all of the channels has reached or exceeded a maximum duration, such as 1, 1.5, or 2 seconds.

The portable electronic device then displays the available WLANs to the user, including access points, based on the information received from the access points. For example, the portable electronic device may display access points based on whether or not the user and/or portable electronic device are compatible with the ANQP elements (such as PLMN, NAI, or OI) of an access point, and the bandwidth available through the access point. The portable electronic device may then generate the list of available WLANs by listing only access points that the user and/or portable electronic device already have authority to use or a previous association with, and displaying an indicator, such as a signal strength indicator that is based on the available bandwidth of an access point. The portable electronic device may also display access points based on which access points the user and/or portable electronic device have the most favorable billing arrangement with and/or which access points have the largest available bandwidth. For example, the portable electronic device may display only the access point with the largest available bandwidth of all the available access points that have compatible OI and free access for the user.

In some embodiments, the portable electronic device may scan for access points while some subsystems of the portable electronic device are in a sleep state. For example, if the portable electronic device is a smartphone that is not actively being used, it may be in a standby mode in a user's pocket. In some embodiments, a network subsystem in the portable electronic device may be loaded with information, including the compatible PLMN, NAI, and/or OI. The network subsystem may then scan for access points and query them as described above, without waking other subsystems in the portable electronic device from their sleep state. Then, if the scan finds a compatible access point, the network subsystem may alert other subsystems in the portable electronic device so that a WLAN connection can be made to the access point. For example, the network subsystem may wake the processing subsystem which controls the networking subsystem to switch from sending and receiving data using a cellular subsystem and to connect to the access point using a WLAN subsystem.

Portable Electronic Device

FIG. 1 presents a block diagram illustrating portable electronic device 100 in accordance with described embodiments. Portable electronic device 100 includes processing subsystem 102, memory subsystem 104, and networking subsystem 106, all coupled together and communicating through bus 108.

Processing subsystem 102 includes one or more devices configured to perform computational operations. For example, processing subsystem 102 can include one or more microprocessors, application-specific integrated circuits (ASICs), microcontrollers, application processors, and/or programmable-logic devices.

Memory subsystem 104 includes one or more devices for storing data and/or instructions for processing subsystem 102, and networking subsystem 106. For example, memory subsystem 104 can include any type of computer-readable storage medium such as dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in portable electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by portable electronic device 100 as fast-access storage for often-used data, while the mass-storage device is used to store less frequently used data.

Networking subsystem 106 includes one or more devices configured to couple to and communicate on a wired and/or wireless network (i.e., to perform network operations), including one or more cellular subsystems that may include cellular data and/or cellular voice subsystems that communicate on cellular networks (e.g., a 3G/4G network such as 1x, UMTS, LTE, etc.), and a WLAN subsystem for communicating on a WLAN, including portions based on standards described in IEEE 802.11 (such as a Wi-Fi networking system) and may further include portions based on standards described in the 802.11u amendment. Networking subsystem 106 can include a Bluetooth networking subsystem (which may include Bluetooth low energy (BLE) capabilities), a universal serial bus (USB) networking subsystem, an Ethernet networking subsystem, and/or other networking subsystems). Networking subsystem 106 will be discussed in more detail below with respect to FIG. 2.

Processing subsystem 102, memory subsystem 104, and networking subsystem 106 are coupled together using bus 108. Bus 108 is an electrical, optical, or electro-optical connection that the subsystems can use to communicate commands and data among one another. Although only one bus 108 is shown for clarity, different embodiments can include a different number or configuration of electrical, optical, or electro-optical connections among the subsystems.

Although shown as separate subsystems in FIG. 1, in some embodiments, some or all of a given subsystem can be integrated into one or more of the other subsystems in portable electronic device 100. Although alternative embodiments can be configured in this way, for clarity we describe the subsystems separately.

Portable electronic device 100 can be (or can be included in) any device with at least one processing subsystem and one networking subsystem. For example, portable electronic device 100 can be (or can be included in) a laptop computer, a media player, a subnotebook/netbook, a tablet computer, a cellular phone, a personal digital assistant (PDA), a smartphone, a toy, a controller, or another device.

Portable electronic device 100 may also include one or more additional processing subsystems 102, memory subsystems 104, and/or networking subsystems 106. Additionally, one or more of the subsystems may not be present in portable electronic device 100. Furthermore, although we use specific subsystems to describe portable electronic device 100, in alternative embodiments, portable electronic device 100 may include one or more additional subsystems that are not shown in FIG. 1. For example, portable electronic device 100 may also include, without limitation, a data collection subsystem, an alarm subsystem, an audio subsystem, a display subsystem and/or an input/output (I/O) subsystem. For example, portable electronic device 100 may include a display subsystem which can include any type of display technology, such as light-emitting diode (LED), organic light-emitting diode (OLED), liquid crystal display (LCD) (such as thin film transistor (TFT), and/or other types of display technology. In addition, the display subsystem may include mechanisms for processing data, and/or other information for display and may also include an audio subsystem for producing sound. The display subsystem may also include touch screen technology for inputting information into portable electronic device 100. In some embodiments, one or more memory caches and/or processing systems or other hardware modules may be located in the display subsystem.

Network Subsystem

Figure 2:
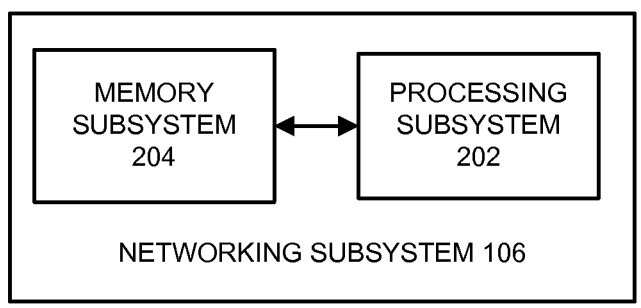
FIG. 2 presents a block diagram illustrating a networking subsystem in accordance with described embodiments.

FIG. 2 presents a block diagram illustrating a networking subsystem in accordance with described embodiments. Networking subsystem 106 includes processing subsystem 202 and memory subsystem 204. Networking subsystem 106 also includes controllers, radios/antennas, sockets/plugs, and/or other devices used for coupling to, communicating on, and handling data and events for each supported networking system, including WLANs implementing 802.11 technology.

Processing subsystem 202 may include one or more devices configured to perform computational operations. For example, processing subsystem 202 can include one or more microprocessors, application-specific integrated circuits (ASICs), microcontrollers, application processors, ARM processors, and/or programmable-logic devices.

Memory subsystem 204 includes one or more devices for storing data and/or instructions for processing subsystem 202, and other data or information received by and/or for transmission by networking subsystem 106. Memory subsystem 204 can include any type of computer-readable storage medium such as dynamic random access memory (DRAM), static random access memory (SRAM), and/or other types of memory. In addition, memory subsystem 204 can include mechanisms for controlling access to the memory. Additionally, memory subsystem 204 may include firmware and/or software or other data and instructions used by networking subsystem 106 to manage and communicate using networking subsystem 106.

Operating System

Figure 3:
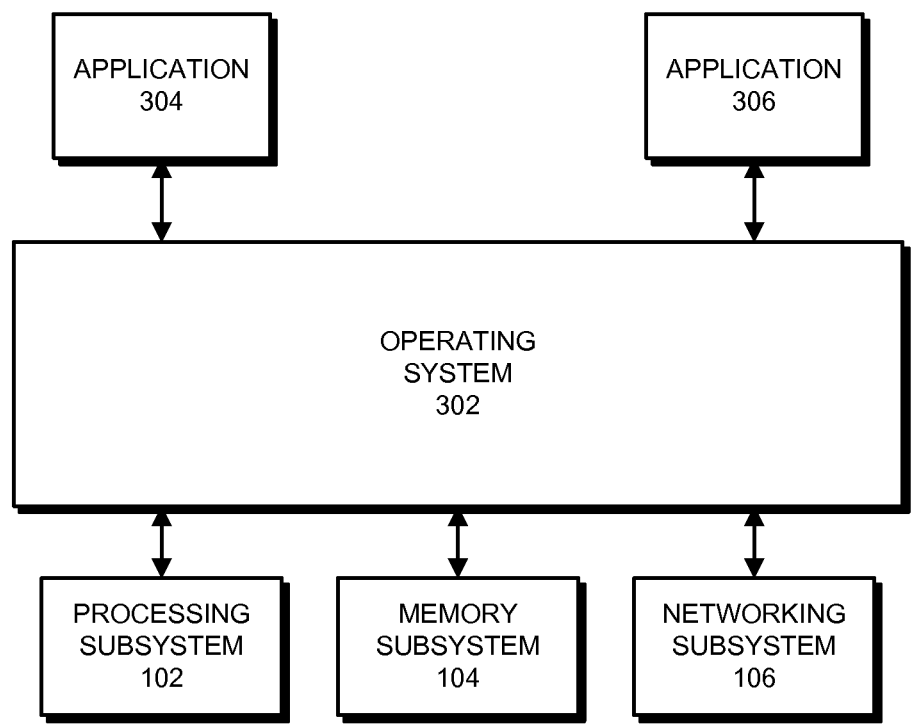
FIG. 3 presents a block diagram illustrating an operating system, applications and subsystems of a portable electronic device in accordance with described embodiments.

FIG. 3 presents a block diagram illustrating operating system 302 in accordance with the described embodiments. In some embodiments, operating system 302 is stored (as program code) in memory subsystem 104 and executed by processing subsystem 102.

Generally, operating system 302 serves as an intermediary between system hardware in portable electronic device 100 (e.g., subsystems 102-106) and applications executed by processing subsystem 102, such as applications 304-306 (which can be, for example, an email application, a web browser, a text messaging application, a voice communication application, an alarm application, and/or a game application). For example, operating system 302 can be, but is not limited to, the iOS operating system or OS X operating system, both from Apple Inc. of Cupertino, Calif.; Windows Phone from Microsoft Corporation; Android from the Open Handset Alliance; the FreeBSD operating system from The FreeBSD Foundation of Boulder, Colo.; or another operating system. Operating systems and their general functions are known in the art and hence are not described in detail.

To manage the transfer of packets to and from applications 304-306 and operating system 302 in portable electronic device 100 using an appropriate interface in networking subsystem 106, operating system 302 maintains one or more network protocol stacks (not shown) that each includes a number of logical layers. For example, the operating system can maintain a cellular protocol stack and/or an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stack are known in the art and hence are not described in detail.

Operating system 302 may also include one or more drivers that enable applications 304-306 and/or other software such as operating system 302 to communicate and/or control hardware in portable electronic device 100. For example, operating system 302 may include driver software that enables application 304 to use and/or control networking subsystem 106. Note that in some embodiments, a driver may be implemented as an application separate from operating system 302, while in other embodiments, the driver may be loaded into or otherwise incorporated into operating system 302.

Determining Parameters of an Access Point

Figure 4:
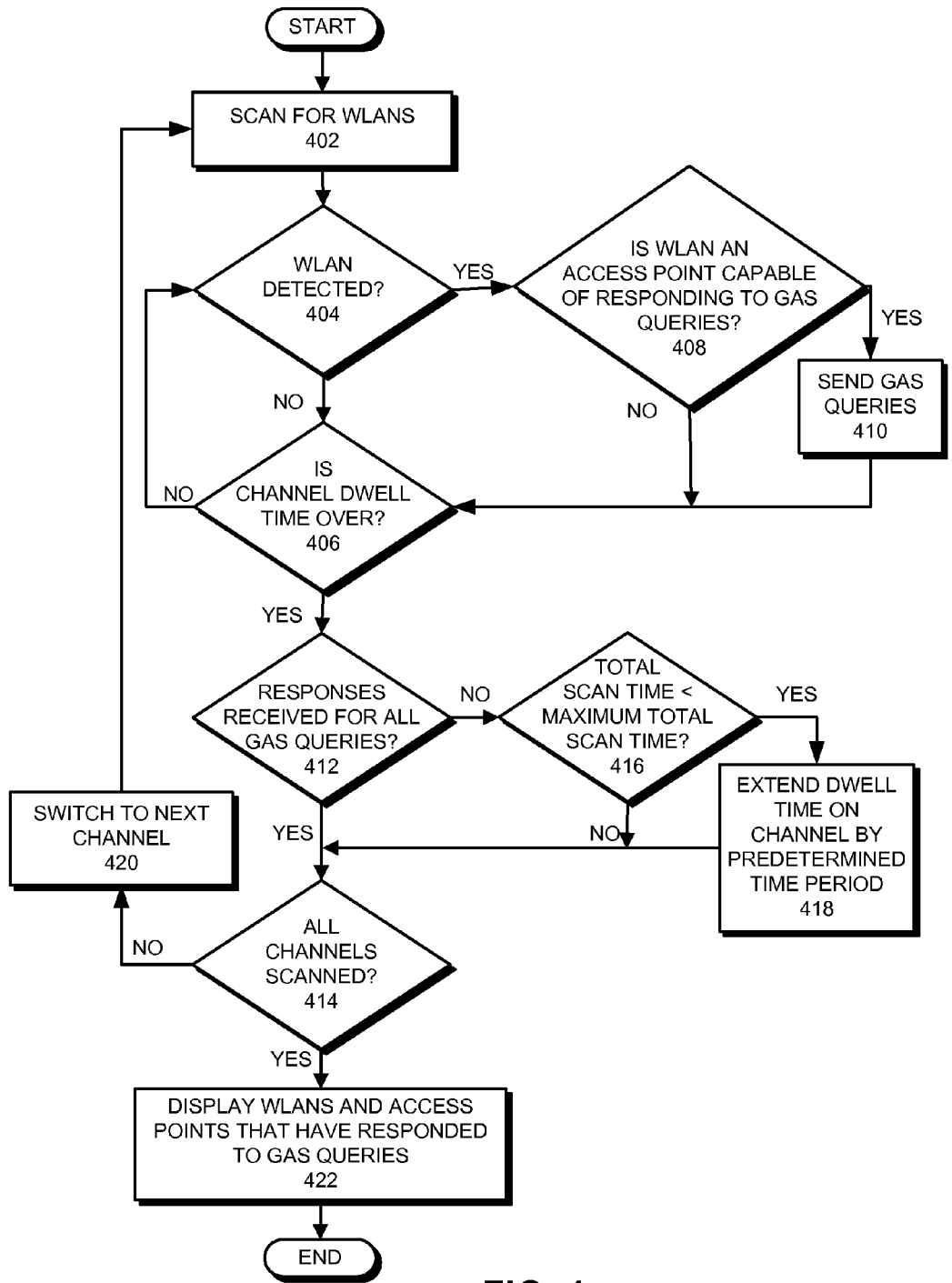
FIG. 4 presents a flowchart illustrating a process for determining parameters of an access point in accordance with described embodiments.

FIG. 4 presents a flowchart illustrating a process for determining parameters of an access point in accordance with described embodiments. The operations shown in FIG. 4 may be performed by a portable electronic device, such as portable electronic device 100, and in some embodiments, may be performed by a processing subsystem in the portable electronic device, such as processing subsystem 102 and/or processing subsystem 202. Additionally, programming and or other code and instruction for performing the operations shown in FIG. 4 may be stored in memory in the portable electronic device, such as memory subsystem 104 and/or memory subsystem 204.

The process of FIG. 4 may begin when a user activates a scan for WLANs on portable electronic device 100 (step 402). This may occur, for example, when a user with a smartphone enters a mall or an airport and wants to try to connect portable electronic device 100 to a WLAN using networking subsystem 106.

Portable electronic device 100 begins scanning for WLANs. This process may begin with portable electronic device 100 controlling networking subsystem 106 to start on one WLAN channel and broadcast one or more probe request frames. Networking subsystem 106 waits for the dwell time on the channel (e.g., 40 ms) for responses (e.g., probe request responses) from any available WLANs, such as hotspots and other access points. At step 404 if a WLAN is not detected (e.g., no probe response received), then the process continues to step 406. At step 406 if the dwell time on the current channel has not yet expired, then the process returns to step 404.

At step 404 if a WLAN has been detected (e.g., a probe response frame is received), then the process continues to step 408. At step 408 if the probe response frame from the access point does not indicate that the access point implements a mechanism to make available information related to the services it provides (i.e., is not from an access point that, for example, implements technology described in the IEEE 802.11u amendment, and/or is not from an access point that supports GAS queries and/or a similar/analogous technology), then the process returns to step 406. However, if the probe response frame indicates that the access point does have such a mechanism (e.g., it can respond to GAS queries or the like), then the process proceeds from step 408 to step 410 where networking subsystem 106 transmits the request for the information (e.g., the GAS query) to the access point. Note that, in some embodiments, portable electronic device 100 may request all available information from the access point, and in some embodiments, it may request a subset of all available information. In some embodiments, the information requested may include ANQP elements such as PLMN, NAI, or OI of an access point, and the available bandwidth. The process then returns to step 406. Note that, while portable electronic device 100 is scanning a particular WLAN channel, responses to requests for additional information (e.g., GAS responses) from access points may be received at any time.

At step 406 if the dwell time (e.g., 40 ms) on the current WLAN channel has expired, then the process continues to step 412. Then, if responses have been received from all access points that portable electronic device 100 has requested information from (e.g., GAS responses have been received from all access points on the current channel that were sent GAS requests), then the process continues to step 414. If responses were not received for all requests at step 412, then the process continues to step 416. At step 416, if the total scan time is not less than the maximum total scan time, then the process continues to step 414, while if the total scan time is less than the maximum total scan time then portable electronic device 100 will extend the dwell time on the current WLAN channel by up to a predetermined amount (e.g., 40 ms) to wait for the responses from the remaining access points that have not yet responded (step 418). Note that the maximum total scan time may be determined based on information including, but not limited to, one or more of the following: data gathered about the response times of access points to such requests (e.g., statistical data such as mean and variance of response times and/or the correlation of the responses with such response time statistics); and/or observations, measurements, and other indications of user experience based on wait times and/or results of such scans.

Figure 5A:
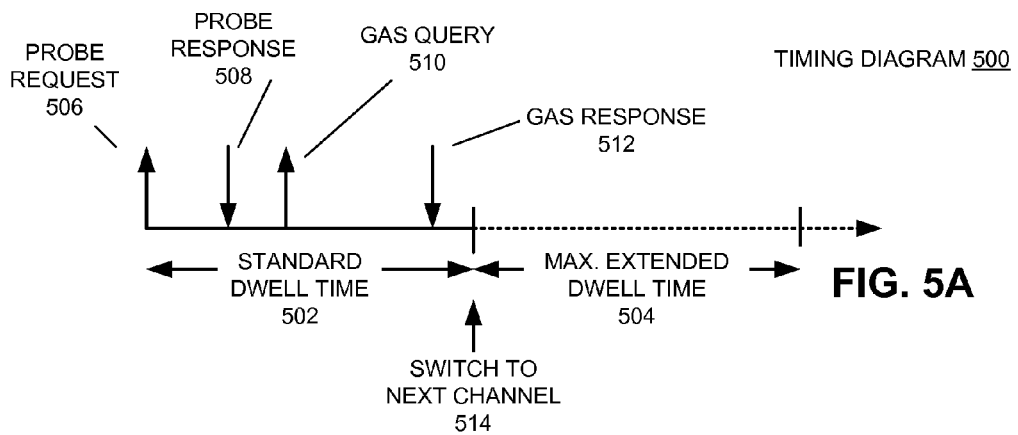
FIGS. 5A, 5B, & 5C depict timing diagrams showing the use of an extended dwell time while scanning a WLAN channel and awaiting a generic advertisement service (GAS) response in accordance with described embodiments.
Figure 5B:
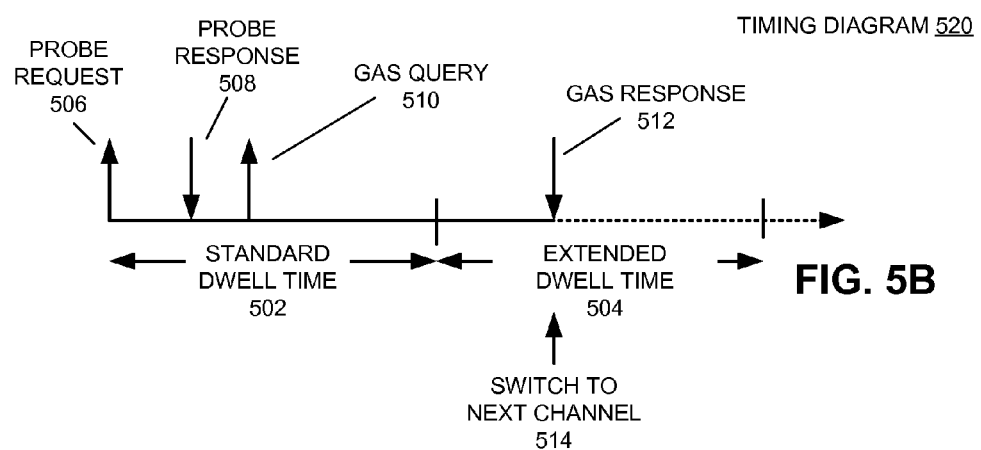
Figure 5C:
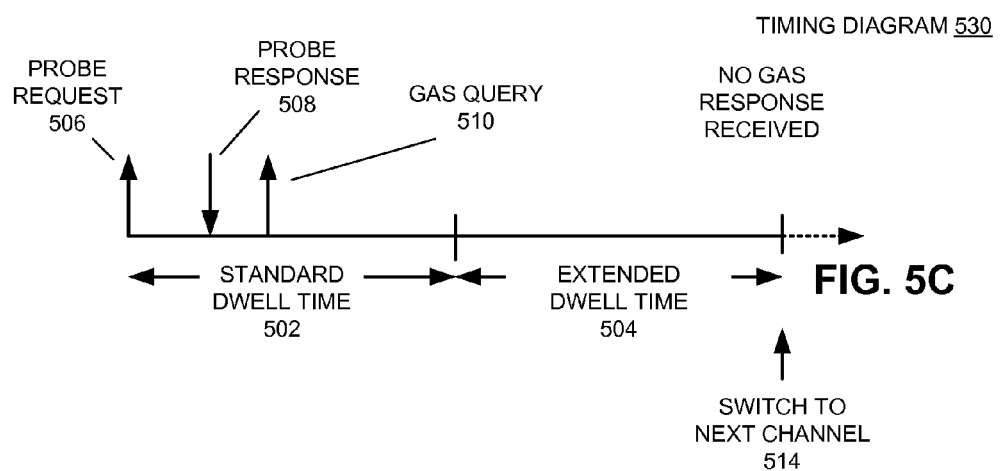

FIG. 5A, 5B, & 5C depict timing diagrams showing the use of an extended dwell time while scanning a WLAN channel and awaiting a GAS response in accordance with described embodiments. FIG. 5A depicts timing diagram 500 which includes two time periods, standard dwell time 502 (e.g., 40 ms) and extended dwell time 504 (e.g., 40 ms). At the beginning of standard dwell time 502, portable electronic device 100 transmits probe request 506. Then, before the end of standard dwell time 502 (e.g., within 40 ms), probe response 508 is received by portable electronic device 100 from an access point. Portable electronic device 100 then transmits GAS query 510 to the access point and waits for a GAS response. In timing diagram 500, GAS response 512 is received before the end of standard dwell time 502. Portable electronic device 100 remains on the WLAN channel until the end of standard dwell time 502 (e.g., waiting for other access points to respond to probe request 506). Then at the end of standard dwell time 502, portable electronic device 100 switches to the next channel and begins scanning it for access points.

FIG. 5B depicts timing diagram 520 in which GAS response 512 is not received until after standard dwell time 502 has ended and extended dwell time 504 has begun. When GAS response 512 is received, portable electronic device 100 switches to the next channel and begins scanning it for access points. FIG. 5C depicts timing diagram 530 in which a GAS response is not received before the end of extended dwell time 504. Portable electronic device 100 switches to the next channel after the end of extended dwell time 504 and begins scanning it for access points.

Returning to FIG. 4, At step 414, if all of the WLAN channels have not yet been scanned, then the process continues to step 420 where portable electronic device 100 switches to the next WLAN channel (e.g., an unscanned channel), and then proceeds to step 402 and begins the process of scanning the channel as described above. At step 414 if all of the WLAN channels have been scanned, then the process continues to step 422. At step 422, portable electronic device 100 displays the WLANs that have been discovered during the scan, including the access points that have responded to the queries (e.g., access points that have responded to the GAS queries and provided portable electronic device 100 with the requested information).

In some embodiments, portable electronic device 100 may display some or all of the WLANs and/or access points to the user based on the content of the responses received from the access points. For example, in the case that portable electronic device 100 requested ANQP elements such as PLMN, NAI, or OI, and the available bandwidth of the access points, portable electronic device 100 may display only those access points that have a PLMN, NAI, and/or OI compatible with portable electronic device 100. Additionally, portable electronic device 100 may display the access points with an indicator (e.g., signal strength indicator) that is determined based on the received signal strength of the access point and its available bandwidth. Portable electronic device 100 may display this information to a user using a display subsystem.

In some embodiments, after portable electronic device 100 displays the available WLANs, (e.g., at step 422), portable electronic device 100 may begin rescanning WLAN channels for access points that did not respond to queries before the dwell time (and extended dwell time, if it was used) expired. For example, if an access point on a channel did not respond to a GAS query before the expiration of the dwell time and extended dwell time for that channel, then after the WLANs have been displayed to the user, portable electronic device 100 may control networking subsystem 106 to return to that channel and continue listening for a response for the access point, or resend the query and wait for the response. Note that portable electronic device 100 may control networking subsystem 106 to dwell on the channel for a dwell time that can extend from the original dwell time (e.g., 40 ms) to the original plus extended dwell time (e.g., 40 ms+40 ms) or any desired period of time which may be based on information including: whether a WLAN has already been selected by the user, the responses received from other access points to the queries (e.g., did any of the other access points have PLMN, NAI, or OI that are compatible), and/or how many other access points on this and/or other channels did not respond. Then, when responses are received, portable electronic device 100 may update the list of WLANs displayed to the user on the display subsystem.

In some embodiments, after the user has selected a WLAN, portable electronic device 100 may continue scanning for WLANs so that, for example, if the user is moving the WLAN list can be kept up to date. Portable electronic device 100 may store in memory subsystem 104 and/or memory subsystem 204 the WLANs that have already been discovered and the responses from access points that have already been received so that these access points do not have to be queried again. In some embodiments, portable electronic device 100 may alter the dwell time and extended dwell time used when scanning channels after portable electronic device 100 is connected to a WLAN. The dwell time may be made longer since portable electronic device 100 is already connected to a WLAN and the user is not waiting for a list of WLANs to appear on the display subsystem.

Figure 6:
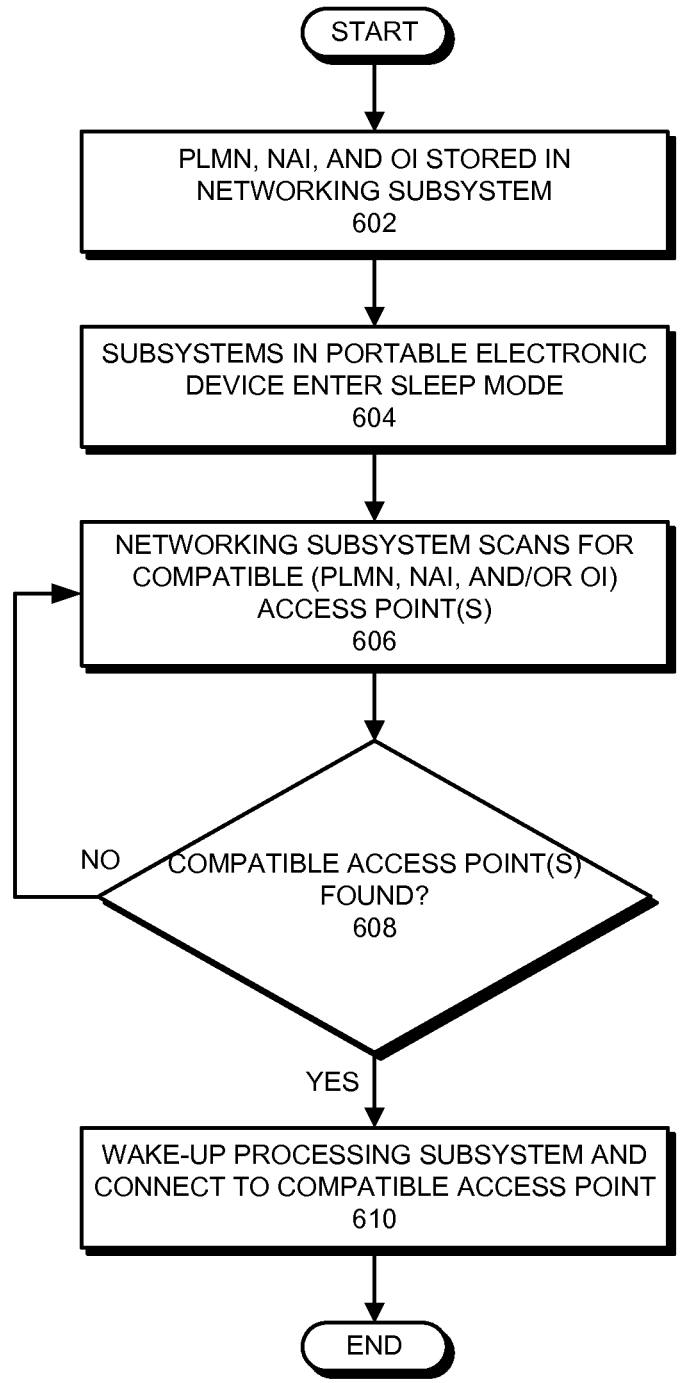
FIG. 6 presents a flowchart illustrating a process for scanning for access points while subsystems in the portable electronic device are in a sleep mode in accordance with described embodiments.

FIG. 6 presents a flowchart illustrating a process for scanning for access points while subsystems in the portable electronic device are in a sleep mode in accordance with described embodiments. The operations shown in FIG. 6 may be performed by a portable electronic device, such as portable electronic device 100, and in some embodiments some or all of the operations may be performed by a processing subsystem in the portable electronic device, such as processing subsystem 102 and/or processing subsystem 202. Additionally, programming and or other code and instructions for performing the operations shown in FIG. 6 may be stored in memory in the portable electronic device, such as memory subsystem 104 and/or memory subsystem 204.

The process of FIG. 6 may begin when the PLMN(s), NAI(s), and/or OI(s) for portable electronic device 100 and/or the user (e.g., as entered into portable electronic device 100 or available from a SIM card in portable electronic device 100) are stored in memory subsystem 204 in networking subsystem 106 (step 602). Then, at step 604 one or more subsystems of portable electronic device 100 enter a sleep mode. This may occur when the user puts portable electronic device 100 (e.g., a smartphone) in a pocket and, after a period of time, processing subsystem 102 and the display subsystem may enter a sleep mode (e.g., a lower power usage mode in which the display of the display subsystem is dimmed or darkened and processing subsystem 102 enters a lower power usage mode.

Then, at step 606, processing subsystem 202 in networking subsystem 106 may begin controlling networking subsystem 106 to scan for access points that have compatible parameters (e.g., PLMN, NAI, and/or OI) so that portable electronic device 100 can connect and use the WLAN subsystem instead of the cellular data subsystem of networking subsystem 106. Networking subsystem 106 may scan for access points using a process similar to that described above. Then, at step 608, if a compatible access point is not found, the process returns to step 606 and the search continues. However, if a compatible access point is found at step 608, then the process continues to step 610 and processing subsystem 202 may wake up one or more subsystems of portable electronic device 100 (e.g., processing subsystem 102) and request that networking subsystem 106 switch from communicating data using the cellular subsystem to using the WLAN subsystem by connecting to the compatible access point.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for determining parameters of an access point, comprising:
   during a first time period,
      scanning for access points on a wireless local area network (WLAN) channel;
      when an access point is detected on the WLAN channel, determining if the access point includes a generic advertisement service (GAS) protocol to make available information related to services provided by the access point; and
      when the access point includes the GAS protocol, then transmitting a GAS request frame to the access point;
   when a response to the GAS request frame is not received from the access point within the first time period, extending a dwell time to wait for the response for a second time period, wherein a duration of the second time period is determined based on a total allowable time to scan for access points on a set of WLAN channels, and wherein waiting for the response for the second time period comprises terminating waiting as soon as the response is received during the second time period; and
displaying information related to the access point only if the response was received within the first time period or within the second time period.

2. The method of claim 1, wherein the access point operates using a protocol compliant with the IEEE 802.11u standard.

3. The method of claim 2, further including determining if information related to the access point should be displayed based on information related to an access network query protocol (ANQP) query response received from the access point.

4. The method of claim 1, wherein if the response is received within the second time period, switching to a second WLAN channel to scan for access points when the response is received.

5. The method of claim 1, wherein the second time period is equal to or less than the first time period.

6. The method of claim 1, wherein the total allowable time to scan for access points on the set of WLAN channels is less than or equal to 2 seconds.

7. The method of claim 1, further including:
in the case that the response is not received within the first time period and not received within the second time period, returning to the WLAN channel and transmitting a second GAS request frame after scanning WLAN channels in a set of WLAN channels.

8. A non-transitory computer-readable storage medium containing instructions that, when executed by a portable electronic device, cause the portable electronic device to perform a method for determining parameters of an access point, the method comprising:
during a first time period,
scanning for access points on a wireless local area network (WLAN) channel;
when the access point is detected on the WLAN channel, determining if the access point includes a mechanism to make available information related to services provided by the access point; and
when the access point includes the mechanism, then transmitting a request to the access point for information related to the services provided by the access point; and
when a response to the request is not received from the access point within the first time period, continuing to wait for the response for a second time period, wherein waiting for the response for the second time period comprises terminating waiting as soon as the response is received during the second time period.

9. The non-transitory computer-readable storage medium of claim 8, wherein the mechanism to make available information related to services provided by the access point includes use of a generic advertisement service (GAS) protocol.

10. The non-transitory computer-readable storage medium of claim 8, wherein the access point operates using a protocol compliant with the IEEE 802.11u standard.

11. The non-transitory computer-readable storage medium of claim 10, further including determining if information related to the access point should be displayed based on information related to an access network query protocol (ANPQ) query response received from the access point.

12. The non-transitory computer-readable storage medium of claim 8, further including displaying information related to the access point only if:
the response to the request was received by the end of the first time period, or
in the case that the response to the request was not received by the end of the first time period, the response to the request was received by the end of the second time period.

13. The non-transitory computer-readable storage medium of claim 8, wherein the second time period is equal to or less than the first time period.

14. The non-transitory computer-readable storage medium of claim 8, wherein a duration of the second time period is determined based on a total allowable time to scan for access points on a set of WLAN channels.

15. The non-transitory computer-readable storage medium of claim 14, wherein the total allowable time to scan for access points on the set of WLAN channels is less than or equal to 2 seconds.

16. An apparatus that determines parameters of an access point, comprising:
a battery; and
a networking subsystem coupled to and powered by the battery and configured to:
during a first time period,
scan for access points on a WLAN channel;
when the access point is detected on the WLAN channel, determine if the access point includes a mechanism to make available information related to services provided by the access point; and
when the access point includes the mechanism, then transmit a request to the access point for information related to the services provided by the access point; and
when a response to the request is not received from the access point within the first time period, continue to wait for the response for a second time period, wherein waiting for the response for the second time period comprises terminating waiting as soon as the response is received during the second time period.

17. The apparatus of claim 16, further including:
a processing subsystem powered by the battery and coupled to the networking subsystem; and
a display subsystem powered by the battery and coupled to the processing subsystem, wherein the processing subsystem is configured to send information related to the access point to the display after scanning for access points on a set of WLAN channels only if:
the response to the request was received by the end of the first time period, or
in the case that the response to the request was not received by the end of the first time period, the response to the request was received by the end of the second time period.

18. The apparatus of claim 17, wherein:
the networking subsystem includes 802.11u technology;
the networking subsystem is configured to transmit the request to the access point using a generic advertisement service (GAS) protocol; and
the processing subsystem is further configured to determine if information related to the access point should be sent to the display based on information related to an access network query protocol (ANPQ) query response received from the access point.

19. The apparatus of claim 16, wherein the second time period is equal to or less than the first time period, and a duration of the second time period is determined based on a total allowable time to scan for access points on a set of WLAN channels.

20. The method of claim 1, wherein the terminating waiting during the second time period comprises:
   terminating waiting before the total allowable time to scan for access points has passed.

* * * * *